United States Patent [19]

Rizzolo

[11] 4,018,624
[45] Apr. 19, 1977

[54] THERMOCOUPLE STRUCTURE AND METHOD OF MANUFACTURING SAME

[75] Inventor: Silvio J. Rizzolo, Nutley, N.J.

[73] Assignee: Engelhard Minerals & Chemicals Corporation, Murray Hill, N.J.

[22] Filed: Nov. 17, 1975

[21] Appl. No.: 632,462

Related U.S. Application Data

[62] Division of Ser. No. 390,548, Aug. 22, 1973, Pat. No. 3,942,242.

[52] U.S. Cl. .............................. 136/233; 136/230; 136/232; 73/359 R
[51] Int. Cl.² ......................................... H01V 1/02
[58] Field of Search ................. 136/230, 232, 233; 29/573, 473.3; 73/359

[56] References Cited

UNITED STATES PATENTS

| 2,757,220 | 7/1956 | Carter | 136/233 |
|---|---|---|---|
| 3,317,353 | 5/1967 | Bingham | 136/233 |
| 3,477,122 | 11/1969 | Hamrick | 136/233 |
| 3,713,899 | 1/1973 | Sebestyen | 136/233 |
| 3,811,958 | 5/1974 | Maurer | 136/230 |

FOREIGN PATENTS OR APPLICATIONS

| 994,235 | 6/1965 | United Kingdom | 136/233 |
|---|---|---|---|
| 854,570 | 11/1960 | United Kingdom | 29/573 |
| 1,088,660 | 10/1967 | United Kingdom | 29/573 |

OTHER PUBLICATIONS

Gray, "Protected Thermoelements", 1917, pp. 283–285, Bull. Bur. Standards, vol. 13.

Primary Examiner—Nelson Moskowitz

[57] ABSTRACT

A thermocouple structure useful for high temperature applications comprises a pair of thermocouple wires joined at one end to form a thermocouple, the wires being enclosed within a metallic sheath which is closed at one end and open at the other end, the closed end of said sheath enclosing the thermocouple. The thermocouple and wires within the sheath are surrounded and insulated by crushed, compacted mineral oxide material, such as magnesium oxide. The other end of the sheath from which the thermocouple wires extend is filled with ceramic cement to seal the crushed mineral oxide and thermocouple wires therein. The closed end portion of the sheath enclosing the thermocouple has a reduced diameter relative to the other open end portion of the sheath.

19 Claims, 9 Drawing Figures

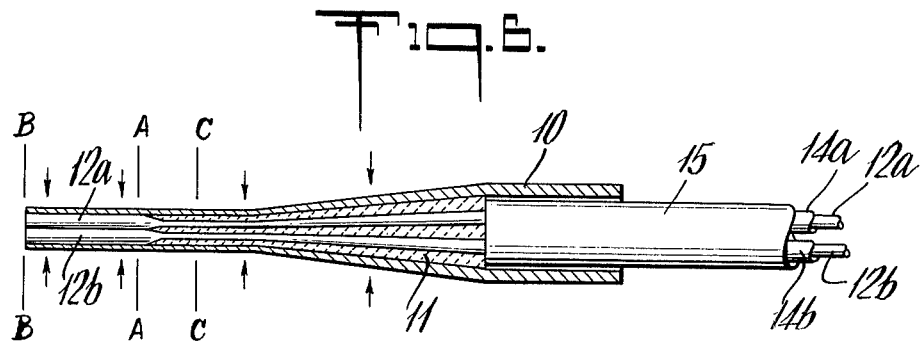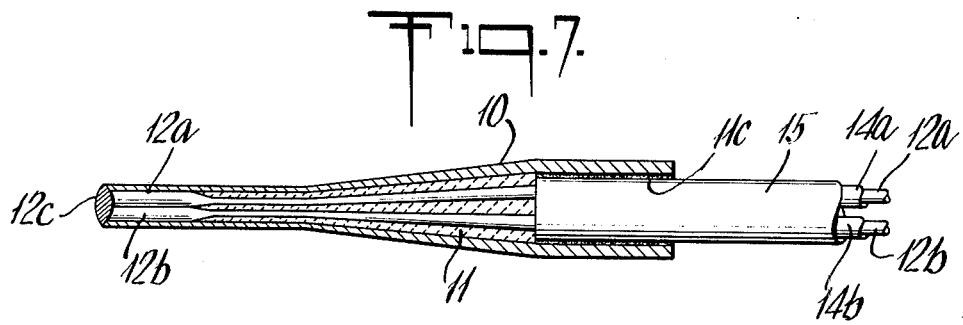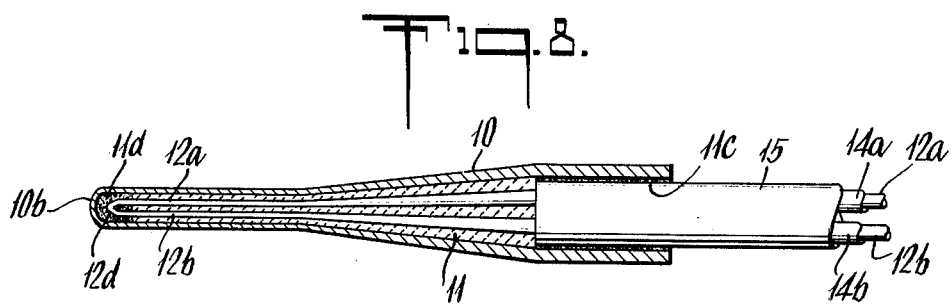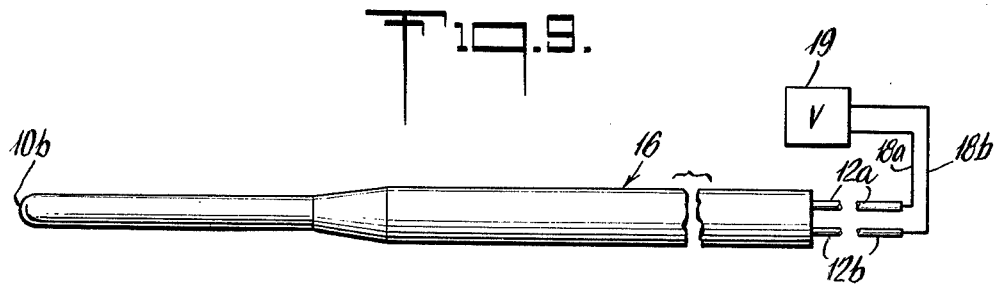

THERMOCOUPLE STRUCTURE AND METHOD OF MANUFACTURING SAME

This is a division of application Ser. No. 390,548, filed 8/22/73, now U.S. Pat. No. 3,942,242.

This invention relates to thermocouples and thermocouple structures and devices containing a thermocouple. In one embodiment this invention relates to a thermocouple structure suitable for high temperature applications, i.e. for the sensing or measuring of high temperatures, e.g. above about 600° F.

Thermocouples and thermocouple structures suitable for high temperature application should be rugged and substantially trouble-free since usually such thermocouples are positioned in difficult-to-reach locations and oftentimes at such locations are subjected to not only the high temperatures to be measured but also to vibration and erosive and corrosive environmental conditions.

It is an object of this invention to provide a thermocouple structure which is capable of installation and use under demanding conditions.

It is another object of this invention to provide a thermocouple structure capable of being manufactured at relatively low cost, particularly as compared with other comparable known thermocouple structures.

In at least one embodiment of the practices of this invention at least one of the foregoing objects will be achieved.

How these and other objects of this invention are achieved will become apparent in the light of the accompanying disclosure made with reference to the accompanying drawings which illustrate the various components and steps in the manufacture of thermocouple structures in accordance with this invention and wherein FIG. 1 is a cross-sectional view of a metallic sheath employed in the manufacture of the finished thermocouple structure;

FIG. 6 illustrates a size reduction or swaging operation wherein the assembly of FIG. 5 is reduced in diameter;

FIG. 7 illustrates in partial cross-section a finished grounded thermocouple in accordance with this invention;

FIG. 8 illustrates in partial cross-section a finished ungrounded thermocouple structure in accordance with this invention; and wherein FIG. 9 schematically represents an EMF or voltage sensing device embodying a thermocouple structure in accordance with this invention.

A thermocouple structure in accordance with this invention comprises a pair of thermocouple wires joined together at one end to form a thermocouple and enclosed within a metallic sheath. The thermocouple wires including the thermocouple enclosed by the metallic sheath are insulated from the metallic sheath and the wires from each other by crushed compacted refractory electrically insulating material, such as a mineral oxide, e.g. magnesium oxide, beryllium oxide, aluminum oxide, zinc oxide, thorium oxide and the like. The other ends or portions of the thermocouple wires which may be insulated, such as by means of conventional rubber or plastic insulating material, but preferably with high temperature insulating material which may also be a plastic, such as a polyimide, e.g. Kapton, extend from the open end of the metallic sheath opposite from the closed end thereof in proximity to the thermocouple. The thermocouple is encased or enclosed within the metallic sheath and ceramic cement is added to the other open end of the metallic sheath from which the thermocouple wires extend so as to not only seal the thermocouple wires therein but also to contain and seal the crushed, compacted mineral oxide refractory material within the sheath.

Reference is now made to the drawings which illustrate components of thermocouple structures in accordance with this invention and various embodiments of thermocouple structures and a device or apparatus employing the same.

Figure 1:
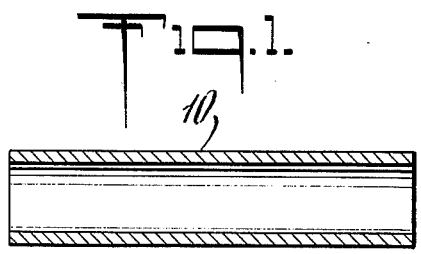
Figure 2:
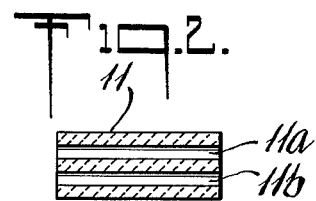
FIG. 2 is a cross-sectional view of a two-hole, perforated mineral oxide (MgO) preform employed in the manufacture of the finished thermocouple structure.
Figure 3:
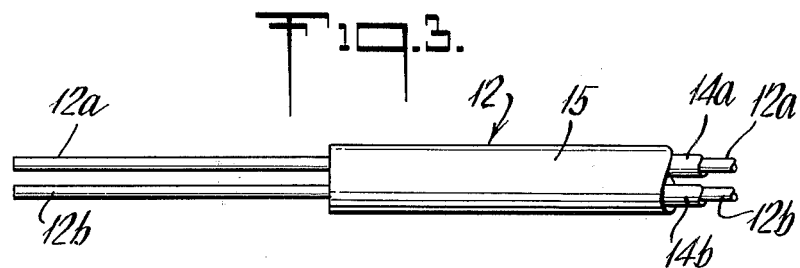
FIG. 3 is a section of a length of thermocouple wires useful in the manufacture of the thermocouple structure.

FIG. 1 illustrates a generally cylindrical open ended metallic sheath or cylinder 10. FIG. 2 illustrates in cross-section a two-hole perforated cylindrical solid refractory mineral oxide, e.g. magnesium oxide, preform 11, the holes or perforations therethrough being identified by reference numerals 11a and 11b. FIG. 3 illustrates a pair of thermocouple wires generally indicated by reference numeral 12. Lengths 12a and 12b of the thermocouple wires are stripped of insulation which is indicated by reference numerals 14a, 14b and 15.

Figure 4:
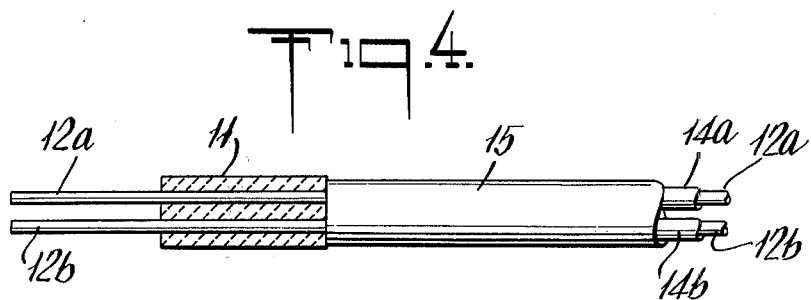
FIG. 4 illustrates the thermocouple wires of FIG. 3 inserted in the mineral oxide preform of FIG. 2.
Figure 5:
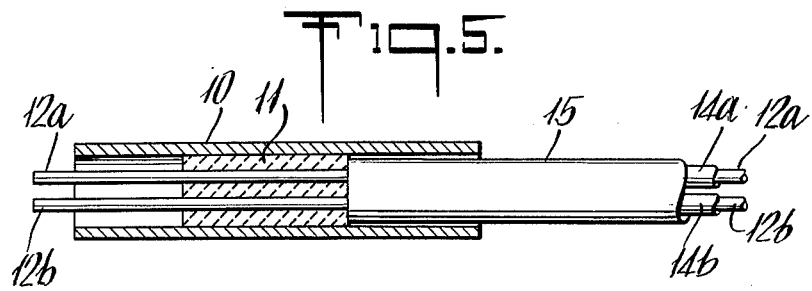
FIG. 5 illustrates in partial cross section the assembly comprising the mineral oxide preform-thermocouple wires assembly of FIG. 4 inserted within the sheath of FIG. 1.

The stripped lengths of thermocouple wires 12a and 12b, which lengths are longer than preform 11, are inserted into preform 11 within perforations 11a and 11b, respectively, as indicated in FIG. 4, and the resulting assembly is inserted within metallic sheath 10 as illustrated in FIG. 5. Thereupon, as illustrated in FIG. 6, the assembly of FIG. 5 is subjected to a swaging or size reducing operation wherein sheath 10 containing the magnesium oxide preform 11 is reduced in diameter and the magnesium oxide material making up preform 11 crushed and compacted. The reduction is carried out to the extent as may be required by the sensor or thermocouple sensitivity desired.

As illustrated in FIG. 6 the end of the zone of migration of the crushed compacted refractory material, i.e. the magnesium oxide, making up preform 11 extends to about line AA.

If a grounded thermocouple structure is to be prepared, as illustrated in FIG. 7, the resulting structure of FIG. 6 would be welded along line BB or cut and welded between lines BB and AA so that sheath 10 would be welded to thermocouple wires 12a and 12b to provide a unitary structure therewith and to form the grounded thermocouple 12c, as fully illustrated in FIG. 7. Cement, such as potting cement 11c, would be provided at the other end of the thermocouple structure to retain the crushed compacted refractory material within sheath 10 and to firmly set thermocouple wire 15 within sheath 10.

If an ungrounded thermocouple structure is to be prepared the swaged reduced assembly illustrated in FIG. 6 would be cut along line CC. The exposed crushed compacted magnesium oxide would be removed, such as by jet abrasion, i.e. directing a jet of abrasive finely divided material onto the exposed crushed magnesium oxide preform material to remove a small amount of this material surrounding the exposed ends of thermocouple wires 12a and 12b. The ends of wires 12a and 12b are then joined together or welded together as illustrated in FIG. 8 to form ungrounded thermocouple 12d. High temperature ceramic cement 11d would then be added to surround thermocouple 12d and the end of sheath 10 would be closed at 10b, such as by joining and welding. The open end of sheath 10 would be filled with a suitable cement, such as potting cement 11c, to seal the insulated thermocouple wires therein and to maintain the crushed compacted magnesium oxide preform material within sheath 10.

Still another embodiment of the practices of this invention is illustrated in accompanying FIG. 9 wherein a thermocouple structure, generally indicated by reference numeral 16, such as may be prepared in the manner described hereinabove, is electrically connected through insulated conductors 18a and 18b which are extensions of insulated wires 12a and 12b, respectively, to a voltage measuring device 19. The apparatus of FIG. 9 might be employed to determine the temperature to which the thermocouple located at about end 10b of thermocouple structure 16 is exposed and, as indicated, depending upon the lengths of wires 18a and 18b the thermocouple may be located a substantial distance, many feet, from device 19.

In the thermocouple structures in accordance with this invention substantially any combination of thermocouple wires useful for measurement of high temperatures, e.g. above 500°–600° C., may be employed, such as wires made of Chromel, a nickel chromium alloy containing about 90% by weight nickel and about 10% by weight chromium, Alumel, a nickel alloy containing about 94% by weight nickel and small amounts of aluminum, manganese and silicon and constantan, a nickel copper alloy comprising about 40–45% by weight nickel of about 55–60% by weight copper.

The metallic sheath making up the thermocouple structure may be made of any suitable metal or metallic material. Preferably, the metallic sheath is made up of a stainless steel, such as Inconel, a nickel and chromium alloy, or a Haynes alloy, such as the various Hastelloys and the various Haynes Stellites. The metallic sheath is made up of a metal which is resistant to oxidative and reduced atmospheres, is corrosive resistant and is capable of withstanding relatively high temperatures. Since the purpose of the metallic sheath is to protect the thermocouple from the environment within which the thermocouple is positioned, the material making up the protective metallic sheath must be effective for this purpose.

The thermocouple structures prepared in accordance with this invention eliminate the electrical connections heretofore found necessary in conventional thermocouple structures between the thermocouple wires and conductors therefrom since in the manufacture of a thermocouple structure in the manner described herein and in accordance with this invention the thermocouple wires can lead directly from the thermocouple end of the thermocouple structure directly to the voltage sensing instrument which might be located a substantial distance from the thermocouple. There is no need for an intermediate electrical connection between the thermocouple and the thermocouple wires making up the thermocouple and the voltage sensing or temperature sensing device. In effect, in thermocouple structures prepared in accordance with this invention the thermocouple wires lead directly without any intermediate electrical connection between the thermocouple made up by joining the wires together and the voltage sensing instrument.

As will be apparent to those skilled in the art in the light of the foregoing disclosure, many modifications, alterations and substitutions are possible in the practice of this invention without departing from the spirit or scope thereof.

I claim:

1. A thermocouple structure comprising a pair of thermocouple wires, the wires being joined together at one end to form a thermocouple, a metallic sheath closed at one end surrounding said wires and enclosing at said one end the thermocouple of said wires, the other ends of said wires being positioned outside the open other end of said sheath, the diameter of said sheath and the separation of said sheath from said wires being smaller at said one end than at said other end, crushed compacted mineral oxide contained within said metallic sheath, said mineral oxide serving to insulate said wires from said sheath and serving to insulate one of said thermocouple wires from the other, and ceramic cement provided at the other end of said sheath from which the thermocouple wires extend, said ceramic cement serving to seal said wires within said sheath and to contain the crushed compacted mineral oxide therein.

2. An EMF or voltage sensing device comprising the thermocouple structure of claim 1 and means electrically connected with said other ends of said wires for detecting a voltage difference between said other ends of said wires.

3. A thermocouple structure in accordance with claim 1 wherein said mineral oxide is magnesium oxide.

4. A thermocouple structure in accordance with claim 1 wherein one of said pair of thermocouple wires is made of a nickel chromium alloy comprising about 90% nickel and 10% chromium as the positive wires of said pair of thermocouple wires, the other of said thermocouple wires being made up of a nickel alloy containing about 94% by weight nickel and small amounts of aluminum, manganese and silicon.

5. A thermocouple structure in accordance with claim 4 wherein said nickel chromium alloy is Chromel and wherein said nickel alloy is Alumel.

6. A thermocouple structure in accordance with claim 1 wherein said thermocouple formed by joining said wires together at said one end is integral with said sheath at said one end thereof.

7. An EMF or voltage sensing device comprising the thermocouple structure of claim 6 and means electrically connected with said other ends of said wires for detecting a voltage difference between said other ends of said wires.

8. A thermocouple structure in accordance with claim 6 wherein said mineral oxide is magnesium oxide.

9. An EMF or voltage sensing device in accordance with claim 7 wherein said mineral oxide is magnesium oxide.

10. A thermocouple structure in accordance with claim 1 wherein said metallic sheath is made up of a stainless steel.

11. A thermocouple structure in accordance with claim 1 wherein said thermocouple wires are made up of constantan, a nickel copper alloy comprising about 40–45% by weight nickel and about 55–60% by weight copper.

12. A thermocouple structure in accordance with claim 1 wherein said metallic sheath is made of Inconel, a corrosion resistant alloy of nickel and chromium.

13. A thermocouple structure in accordance with claim 1 wherein said thermocouple is insulated from said sheath.

14. A thermocouple structure comprising a pair of thermocouple wires, the wires being stripped of insulation material thereon and joined at one end to form a thermocouple, a metallic sheath closed at one end surrounding said wires and enclosing at said one end the thermocouple of said wires, the other ends of said wires being positioned outside the open other end of said sheath, the diameter of said sheath and the separation of said sheath from said wires being smaller at said one end than at said other end, crushed compacted mineral oxide contained within said metallic sheath, said mineral oxide serving to insulate the stripped portions of said wires from said sheath and serving to insulate the stripped portions of said thermocouple wires from each other, and ceramic cement provided at the other end of said sheath from which the thermocouple wires extend, said ceramic cement serving to seal said wires within said sheath and to contain the crushed compacted mineral oxide therein, portions of the thermocouple wires within said sheath and sealed therein by contact with said additional ceramic cement being provided with insulating material thereon.

15. An EMF or voltage sensing device comprising the thermocouple structure of claim 14 and means electrically connected with said other ends of said wires for detecting a voltage difference between said other ends of said wires.

16. A thermocouple structure in accordance with claim 20 wherein the wires within said sheath at said one end thereof have a diameter smaller than the diameter of the wires extending outside the other end of said sheath.

17. A thermocouple structure in accordance with claim 1 wherein said thermocouple formed by joining said wires together at said one end is integral with said sheath at said one end thereof.

18. A thermocouple structure in accordance with claim 1 wherein said mineral oxide is selected from the group consisting of magnesium oxide, zirconium oxide, thorium oxide, beryllium oxide and aluminum oxide.

19. A thermocouple structure in accordance with claim 1 wherein said thermocouple is insulated from said sheath.

* * * * *

UNITED STATES PATENT AND TRADEMARK OFFICE
CERTIFICATE OF CORRECTION

PATENT NO. : 4,018,624
DATED : April 19, 1977
INVENTOR(S) : Silvio J. Rizzolo

It is certified that error appears in the above-identified patent and that said Letters Patent are hereby corrected as shown below:

In column 3, line 42 "of" should read --and--.

In claim 16, column 6, line 13 "20" should read --14--.

In claim 17, column 6, line 18 "1" should read --14--.

In claim 18, column 6, line 22 "1" should read --14--.

In claim 19, column 6, line 26 "1" should read --14--.

Signed and Sealed this fifth Day of July 1977

[SEAL]

Attest:

RUTH C. MASON
Attesting Officer

C. MARSHALL DANN
Commissioner of Patents and Trademarks